(No Model.)

A. J. GOSNELL.
GRAPPLING DEVICE.

No. 272,953. Patented Feb. 27, 1883.

Witnesses:
William J. Poulter
Henry Mills

Inventor:
Andrew J. Gosnell
By W. Burris
Attorney

UNITED STATES PATENT OFFICE.

ANDREW J. GOSNELL, OF TERRE HAUTE, INDIANA, ASSIGNOR TO HIMSELF, AND PETER N. STAFF, OF SAME PLACE.

GRAPPLING DEVICE.

SPECIFICATION forming part of Letters Patent No. 272,953, dated February 27, 1883.

Application filed December 23, 1882. (No model.)

*To all whom it may concern:*

Be it known that I, ANDREW J. GOSNELL, a citizen of the United States, residing at Terre Haute, in the county of Vigo and State of Indiana, have invented certain new and useful Improvements in Grappling Devices, of which the following is a specification, reference being had therein to the accompanying drawings.

This invention relates to grappling devices such as are commonly used in raising timber and various articles; and it consists in an improved construction of grappling-hooks, the same being provided with one or more adjustable spreading-braces connected with the hooks, which are in position opposite each other, the parts being so constructed that the hooks may be readily reversed in position, and thus the grapple may be adapted for attachment to articles of various sizes and forms.

Figure 1:
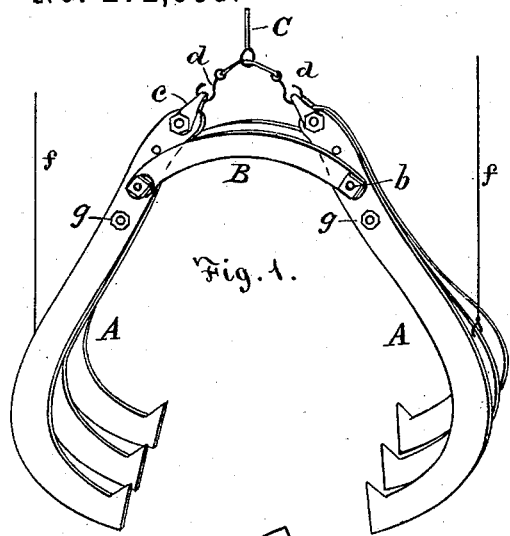
Figure 2:
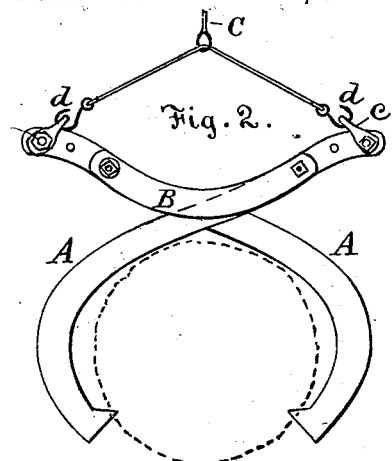
Figure 3:
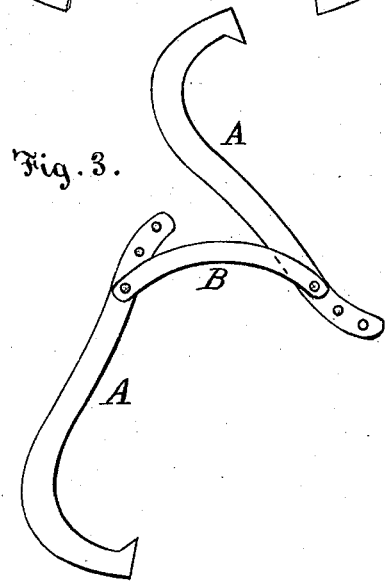
Figure 4:
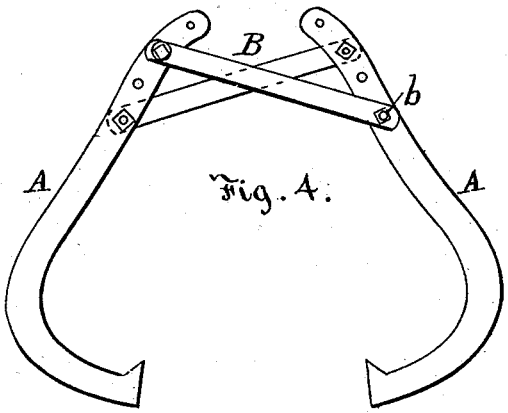
Figure 5:
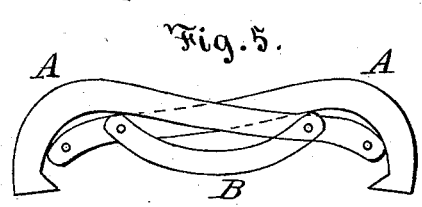
Figure 6:
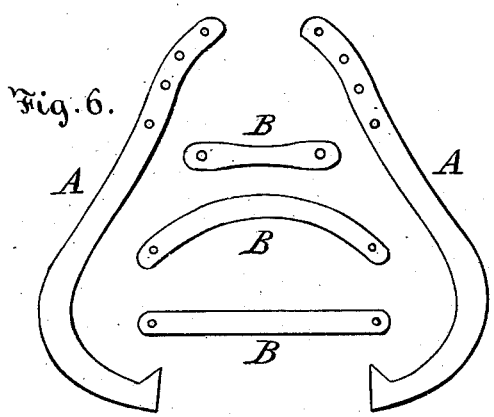

In the accompanying drawings, Figure 1 represents a grappling device having my improvement. Fig. 2 is a side view, showing the grappling-hooks reversed. Fig. 3 illustrates the manner of reversing the position of the grappling-hooks. Fig. 4 shows a modified form of attachment of straight braces to the hooks. Fig. 5 shows the device folded for convenience in packing, &c. Fig. 6 represents detached views of hooks and braces.

A designates the grappling-hooks, one or more on each side being used, three on a side being shown in Fig. 1. These hooks are preferably formed, as shown, to spread apart laterally toward their lower extremities. A number of apertures, a, are made along the upper part of each hook for the purpose of attaching one or more spreading-braces, B, and adjusting them to the hooks, nearer to or farther from the upper extremities of the hooks, as desired. Each of the braces B is adjustably coupled at its extremities to opposite hooks A by means of bolts b, passing through apertures in the braces and hooks, the connection being pivotal, so that the hooks may open and close freely as they work between the braces. The hooks on either side are usually connected at the top by means of a bolt, which also holds a loop, c, for attaching the hooks d, which are connected with the hoisting-cord C. The hooks may be further secured together at g by means of bolts. The washers i are preferably used in the adjustment of the opposite hooks. For certain purposes it is desirable that the hooks A should be allowed to close independently, as in raising irregular-shaped objects, and in such case the bolts at the top are removed, and each hook is connected with the hoisting chain or rope.

A number of braces B are used in connection with the grappling-hooks, one form of brace being curved and another being straight, as seen in Fig. 6. The curved brace is used for round timber, or other articles to which it is applicable, and the straight brace is used for articles having straight surfaces. A short straight brace is also provided for use in drawing sticks of timber endwise, or for raising bulky articles of light weight—such as brush or trash—from the water. As each set of hooks A turns freely on bolt b, the braces being secured on the outside, the hooks may be readily reversed in position by turning them over in opposite directions, as shown in Figs. 2 and 3, this operation bringing the grappling-hooks nearer to each other, so that the device is better adapted for clutching smaller articles. When the hooks are reversed the middle portion of the curved spreaders extending along the arms of the hooks (see Fig. 2) serve to support them.

In using the device for raising snags or other obstructions from the bottom of waters, the grapple being allowed to sink, it is held open by means of cords f, one being attached to each set of hooks. The grapple having reached the object to be removed, these cords are released and the hooks close automatically about the obstacle, which is then raised by means of the hoisting apparatus.

The several parts of the device are readily detached as desired, and a single hook may be used in connection with a pole or staff for the purpose of a cant-hook.

The device may be used for rolling timber without detaching any of its parts, a single hook being used to connect with the timber. It may also be folded, as shown in Fig. 5, for convenience in package or transportation.

I claim—

1. A grappling device having reversible grappling-hooks connected by one or more braces, pivoted below the upper ends of the hook-arms, and adjustable in distance from the ends of the arms, substantially as and for the purposes described.

2. The grappling device consisting of the grappling-hooks A, having the upper portion of the arms provided with the pivot-holes $a$, and connected by one or more braces, B, pivoted below the upper ends of the hook-arms and adjustable in distance from the ends of the arms, substantially as and for the purposes described.

In testimony whereof I affix my signature in presence of two witnesses.

ANDREW J. GOSNELL.

Witnesses:
  GEO. F. LEEMAN,
  JAMES FITZPATRICK.